March 2, 1965 A. CROFT ETAL 3,171,524
CENTRIFUGAL CLUTCHES
Filed Aug. 18, 1960 5 Sheets-Sheet 4
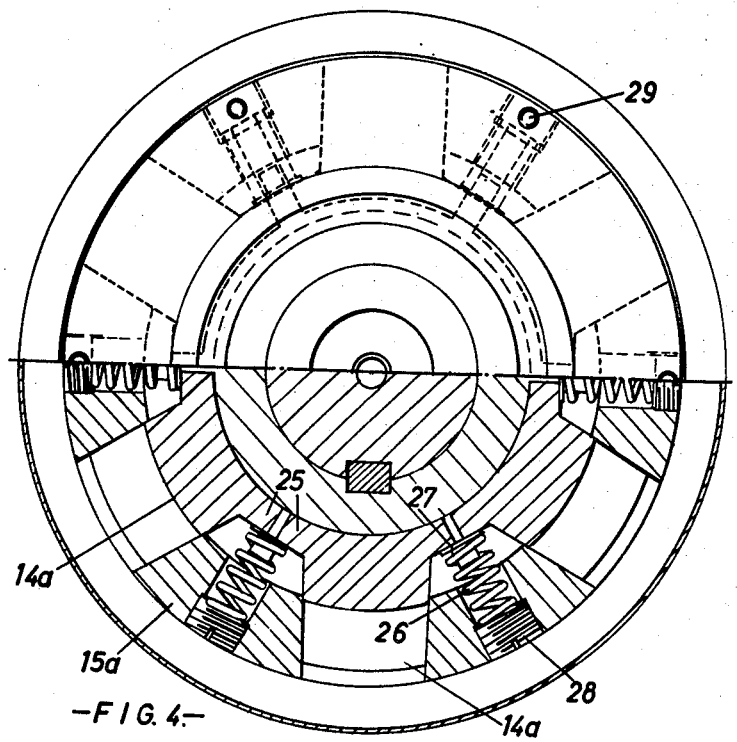
—FIG. 4.—
Arthur Croft
Frederick Oliver Ackroyd
INVENTORS
BY
Pierce, Scheffler & Parker
Attys March 2, 1965  A. CROFT ETAL  3,171,524
CENTRIFUGAL CLUTCHES
Filed Aug. 18, 1960  5 Sheets-Sheet 5
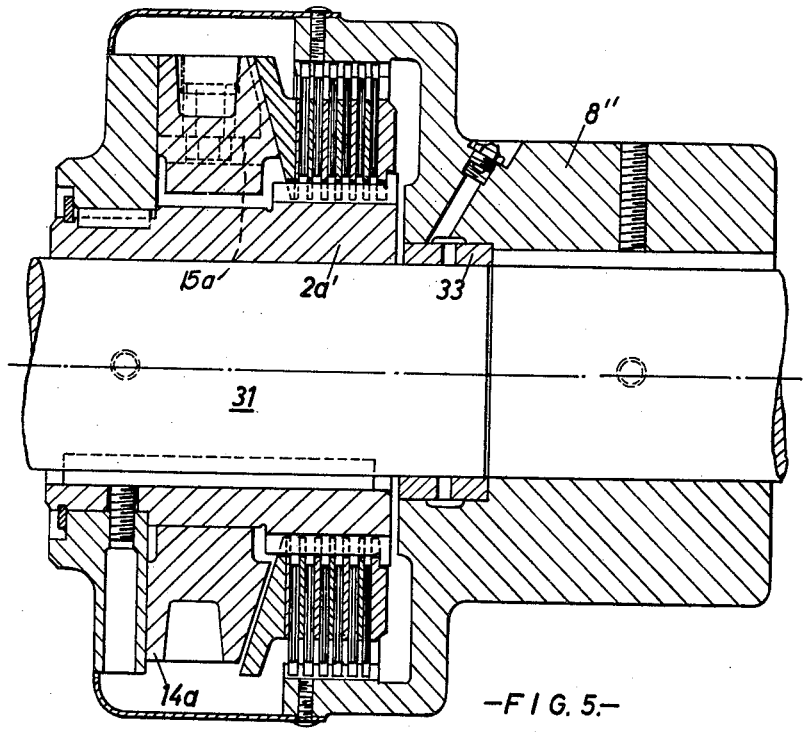
—FIG. 5.—
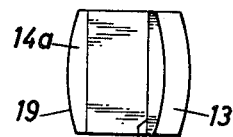
—FIG. 6.—
Arthur Croft
Frederick Oliver Ackroyd
INVENTORS
BY
Pierce, Schiffler & Parker
Attys.

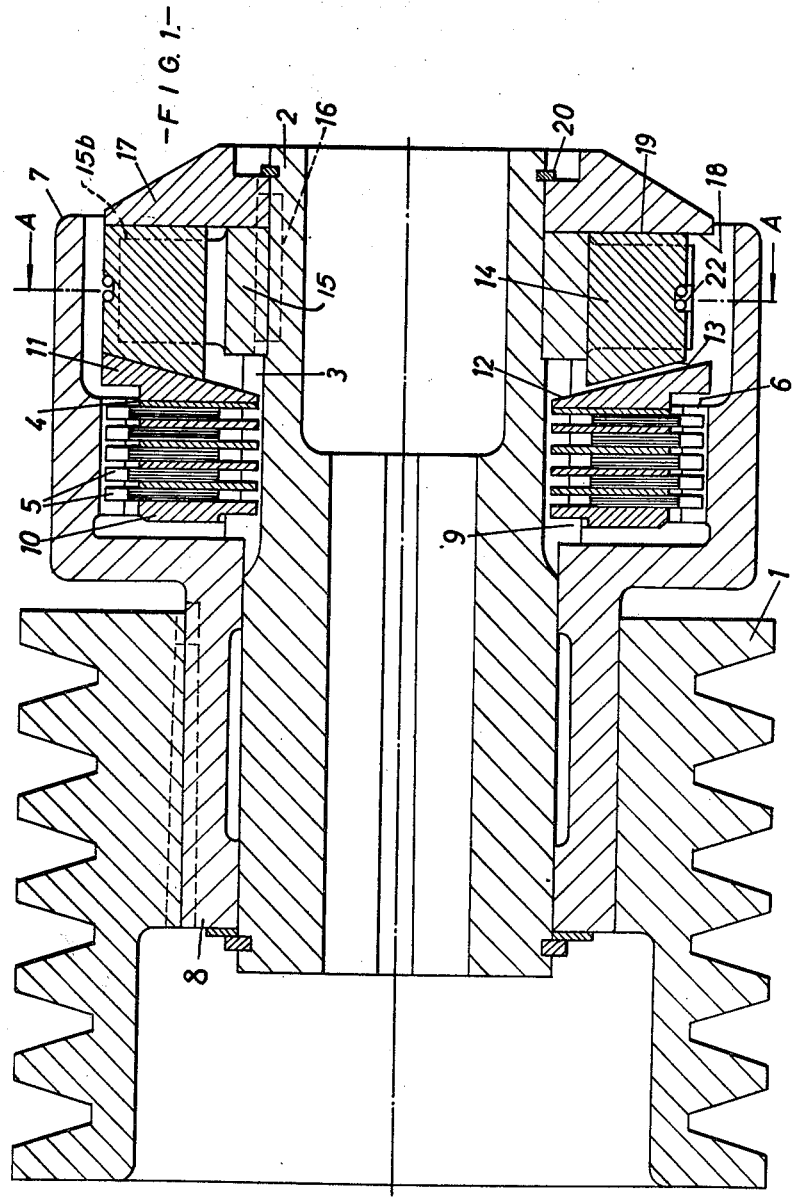

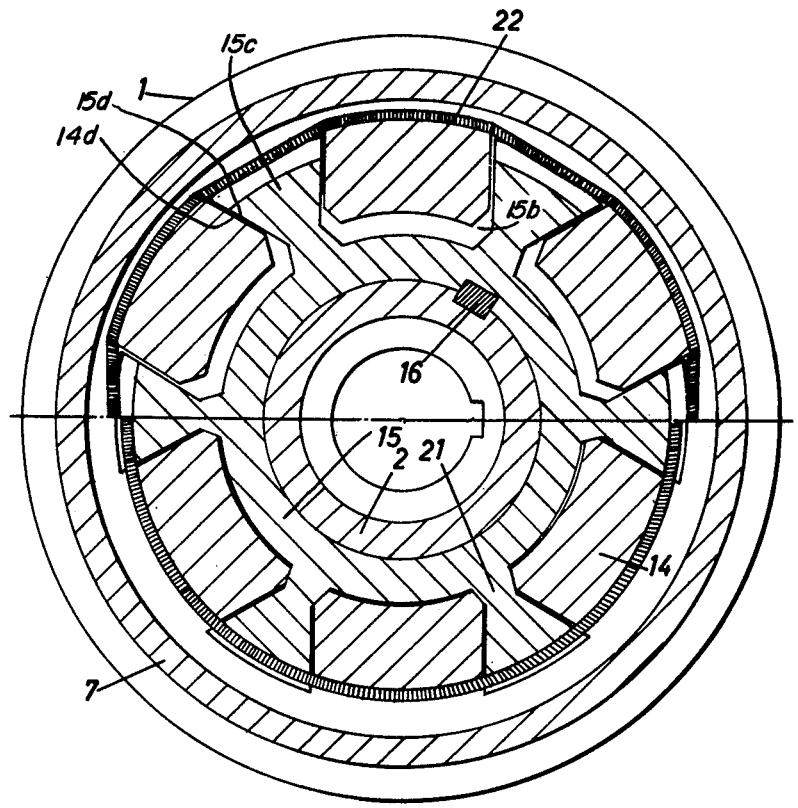
—FIG. 2.—

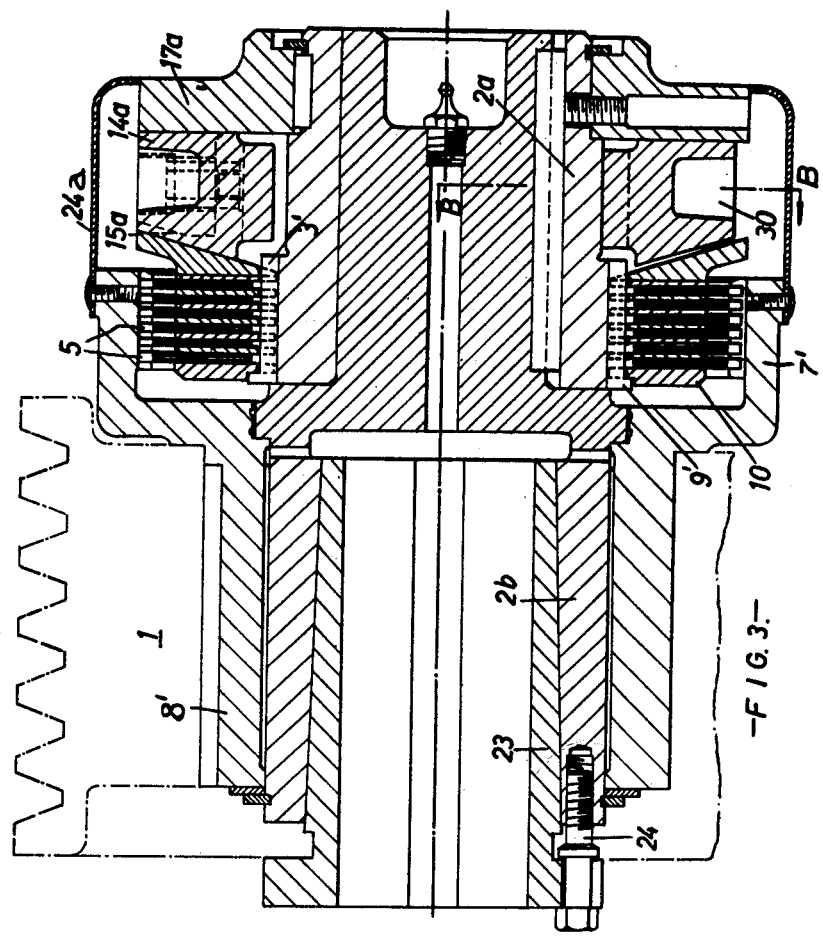

3,171,524
CENTRIFUGAL CLUTCHES
Arthur Croft, Rawdon, and Frederick Oliver Ackroyd, Idle, Bradford, England, assignors to Crofts (Engineers) Limited, Empire Works, Thornbury, Bradford, Yorkshire, England, a company of Great Britain
Filed Aug. 18, 1960, Ser. No. 50,511
Claims priority, application Great Britain, Aug. 24, 1959, 28,842/59
1 Claim. (Cl. 192—105)

This invention relates to centrifugal clutches of the type wherein the radial movements of weights are adapted to be translated into axial thrust on plate-like clutch discs.

There are many known constructions of this type of clutch and the main object of this invention is to provide a simplified form of mounting for the weights and co-acting parts.

Accordingly there is provided a centrifugal disc clutch of the above described type, characterised in that a driving sleeve is surrounded by a number of weights disposed in radial guide slots in a spider element, said weights each having one face engaging a restrained pressure reaction plate and an opposite inclined face engageable with an axially movable pressure plate which engages a set of clutch discs, said discs being restrained by a back plate and respectively in driving connection with said sleeve and an external driven member, the arrangement being that said restrained back plate for the clutch discs, one or more clutch discs, the movable pressure plate, the reaction plate, spider and weights, all rotate with the sleeve as one unit.

The above arrangement may include integral stop means on the driving sleeve for restraining the back plate to prevent end thrust being transmitted from the clutch discs to the driven member. The latter may be rotatably mounted on the sleeve. Also, the weights may be restrained in their outward movement by one or more garter or other springs.

The weights may have their front and rear faces, or at least one, curved transversely to reduce their engagement to substantially line contact.

The invention will now be more particularly described with reference to the accompanying drawings, in which:

FIG. 1 is a composite sectional elevation of a pulley type multi-disc clutch showing the clutch engaged and disengaged;

FIG. 2 is a cross-sectional elevation on line A—A of FIG. 1;

FIG. 3 is a composite sectional elevation of a modified pulley type multi-disc clutch showing the clutch engaged and disengaged;

FIG. 4 is a part cross-sectional elevation the lower part being on line B—B of FIG. 3;

FIG. 5 is a composite sectional elevation of a similar arrangement to FIG. 3, but adapted as a clutch coupling; and FIG. 6 is a detail plan view of a modified clutch operating weight.

In a particular embodiment of this invention, shown in FIGS. 1 and 2, for a centrifugally operated multi-disc clutch with a pulley 1 mounted thereon, a driving sleeve 2 is formed for keying on to a driving shaft. This sleeve may be of, say 0.6% carbon steel and it is furnished with external splines 3 intermediate its ends and such splines may be flame- or otherwise hardened. These splines form the driving connection for one set of clutch discs 4 and the co-acting driven discs 5 have driving connection in known manner with an internal toothed ring 6 which forms an integral part of a housing 7 from which extends a sleeve-like bearing 8 located on part of the driving sleeve 2. This housing 7 and its bearing 8 form the driven member and conveniently the multi-groove pulley 1 is keyed to the bearing. Preferably the inner face of the housing 7 of the driven member bears against a shoulder 9 formed integrally on the sleeve 2 at the end of the splined region for a steel or other back plate 10 to bear against said shoulder and against which plate the clutch discs are thrust in operation.

Against the outer clutch disc 4, which is in driving connection with the splines 3 of the sleeve 2, is arranged a pressure plate 11 which also has driving connection through the splines 3 and the rear face 12 of this pressure plate is inclined to coact with the complementary front bearing faces 13 of a set of centrifugal weights 14. These weights are located in radial slots 15b in a spider 15 which has driving connection with the driving sleeve, such as through a key 16, and against this spider is arranged a removably mounted pressure reaction plate 17 against the inner face 18 of which the rear bearing faces 19 of the weights 14 bear. This plate 17 is restrained by a shoulder provided by a readily removable spring ring 20 or the like recessed into the driving sleeve 2. Alternatively, this removable reaction plate may be an integral part of the spider.

With this arrangement the back plate 10, inner clutch discs 4, movable pressure plate 11, spider 15, weights 14, and pressure reaction plate 17 all rotate as one unit with the driving sleeve 2 and the aforesaid shoulder 9 against which the back plate is pressed prevents any end thrust being transmitted to the driven member, i.e., the housing 7 and bearing 8.

Conveniently, the spider 15 is formed as an inner ring with radial guide projections 15c to form the radial guide slots 15b for the weights 14. These weights have parallel flat side faces 14d engaging the flat faces 15d of the guide projections 15c and such projections have their outer parts, as viewed axially, of substantially truncated V-formation each joined to the ring by an integral neck 21 which tapers towards the outer truncated V part. To enable the weights 14 to pass fully inwardly the edges of the weight are chamfered off to suit the said neck parts. All these projections 15c of the spider 15 have peripheral grooves with similar grooves in the weights in register therewith, so that one or more garter springs 22 can be located around the weights to restrain the outward movement thereof. This spring or these springs may be of such a strength as to delay the action of the weights in their outward movement so as to allow the driving unit, such as an electric motor, to accelerate under no-load until a speed is reached at which the torque is developed to a maximum amount when further increase in speed will increase the centrifugal force to cause the clutch discs to engage and take up drive gradually as the centrifugal force overcomes the resistance of the garter spring or springs.

The above construction may be modified such as is shown in FIGS. 3 and 4. In this particular construction the driving sleeve is formed in two parts, a main part 2b (which may be of cast iron or steel) and a second part 2a, which may be of 0.6% carbon steel. The part 2a is keyed to part 2b and is provided with the splines 3′ which may be flame-hardened, and a shoulder 9′. The part 2b may be parallel bored as in the other case or furnished with a taper bush 23 secured by jacking screws 24, which bush serves to mount the clutch on a shaft. In this instance the housing 7′, whose bearing 8′ is mounted on the sleeve 2b, is of less width than in the previous case and furnished with a displaceable cover 24a. This cover arrangement may be used instead of the construction shown in FIGS. 1 and 2. One of the main differences in this construction is that the spider is in the form of tapered guide projections 15a formed integral with the reaction plate 17a. Also the weights 14a, are furnished with lateral projections 25 which lie, with spacing, close together in adjacent pairs of a set of weights. With this arrangement coiled springs 26 are mounted through holes in the tapered spider bosses, each spring having one end engaging a pressure plate 27 at its inner end and being adjustable by means of the screw 28 at its outer end. Thus each spring acts upon a pair of weights in a radially inward direction and the screws 28 can be locked by set screws 29. Moreover, the weights are hollowed out at 30 to reduce their weight.

Both the above pulley driving clutch devices may be modified for other purposes and in FIG. 5 the construction of FIGS. 3 and 4 is modified to form a clutch coupling. In this instance the driving sleeve 2a′ is employed for keying to a driving shaft 31 and the housing bearing 8″ is keyed to a driven shaft 32. This bearing 8″ is furnished with a bush 33 for centralising the shafts.

The front faces 13 and rear faces 19 of the weights 14 or 14a may be flat to engage similar faces on the pressure reaction plate 17 and movable pressure plate 11 respectively. Alternatively, both faces 13, 19 of the weights may have a transverse slight curvature, as shown in FIG. 6, to reduce the engagement to substantially line contact.

What we claim is:

In a centrifugal disc clutch, the combination comprising a driving sleeve surrounded by a pressure reaction plate located adjacent the outer end of said sleeve, said reaction plate having a driving connection with said sleeve, a spider element integral with said pressure reaction plate and located on the inward side of said reaction plate, said spider element including guide projections thereon projecting axially from the inner face of said pressure reaction plate, block-like weights disposed between said guide projections for radially sliding movement, each of said weights having an inclined front bearing face and a broad rear bearing face engaging said reaction plate and parallel flat sides engaging flat faces on the sides of said guide projections, an axially movable pressure plate having its rear face inclined and immediately facing said front bearing faces of said weights to be engaged thereby, said axially movable pressure plate lying axially on the outside of two sets of clutch discs, a back plate on the opposite side of said clutch discs and restrained on said driving sleeve from axial movement in a direction away from said clutch discs, said back plate together with one set of said clutch discs and said axially movable pressure plate all being slidably mounted on said driving sleeve and in driving connection therewith, the other set of clutch discs being in peripheral driving connection with a driven member which surrounds said clutch discs, and coil spring means engaging said weights to urge them radially inward to a rest position and control them when flying radially outwards into their driving position, each said coil spring means being located between and acting radially upon an adjacent pair of said weights by pressing at their inner ends against lateral projections on said weights, said coil spring means being mounted within recesses in said guide projections and with the outer ends thereof pressing against adjustment screws.

References Cited in the file of this patent
UNITED STATES PATENTS

| | | |
|---|---|---|
| 834,499 | Sturtevant | Oct. 30, 1906 |
| 1,817,006 | Kratzer | Aug. 4, 1931 |
| 1,864,522 | Bartelme | June 28, 1932 |
| 1,889,291 | Pirinoli | Nov. 29, 1932 |
| 1,975,185 | Wemp | Oct. 2, 1934 |
| 1,988,922 | Stephenson | Jan. 22, 1935 |
| 2,172,991 | Segard | Sept. 12, 1939 |
| 2,678,119 | Birbaum | May 11, 1954 |
| 2,833,384 | Wilson | May 6, 1958 |
| 2,947,399 | Moore et al. | Aug. 2, 1960 |
| 3,017,004 | Fawick | Jan. 16, 1962 |

FOREIGN PATENTS

| | | |
|---|---|---|
| 674,600 | Great Britain | June 25, 1952 |
| 214,081 | Australia | Mar. 25, 1958 |